United States Patent [19]

Bentz

[11] 3,848,088

[45] Nov. 12, 1974

[54] HIGH VOLTAGE CONNECTOR ARRANGEMENT

[75] Inventor: John Edward Bentz, Glendale Heights, Ill.

[73] Assignee: Motorola, Inc., Chicago, Ill.

[22] Filed: Sept. 28, 1973

[21] Appl. No.: 401,763

[52] U.S. Cl. ............ 178/7.9, 178/7.5 R, 339/66 T, 339/111

[51] Int. Cl. .......................................... H01j 29/02

[58] Field of Search .............. 178/7.9, 7.3 R, 7.5 R; 328/7; 339/65, 66, 111; 317/9 R, 259

[56] References Cited

UNITED STATES PATENTS

| | | | |
|---|---|---|---|
| 3,082,396 | 3/1963 | Bernhard | 339/65 |
| 3,679,829 | 7/1972 | Hofmeister | 178/7.9 |
| 3,708,618 | 1/1973 | Hofmeister | 178/7.9 |

*Primary Examiner*—Robert L. Griffin
*Assistant Examiner*—Edward L. Coles
*Attorney, Agent, or Firm*—Donald B. Southard; Vincent J. Rauner

[57] ABSTRACT

A high voltage connector arrangement is disclosed especially suited for television receiver application. The high voltage rectifier or diode itself is utilized to make and break the high voltage connection to the receiver picture tube. A self alignment feature is provided by making the associated connector body funnel-shaped which coacts with a suitable guide ring on the rectifier body. An anti-corona ring is included in the base of the connector body along with a resilient spring to effect less than zero extraction force for the rectifier in breaking the high voltage connection.

8 Claims, 4 Drawing Figures

HIGH VOLTAGE CONNECTOR ARRANGEMENT

BACKGROUND FIELD OF INVENTION

The present invention relates in general to high voltage disconnects and more particularly to an improved connector arrangement for a television receiver wherein the high voltage from the associated flyback transformer supplied to the picture tube is automatically disconnected upon pullout of a service drawer and reconnected when the drawer is pushed back in.

In most television receivers the rear or back cover must be removed to gain access to respective component parts for purposes of servicing or testing. However, this is not always required. In one design approach, all but few of the receivers components are included in a slidable drawer assembly which pulls out from the front of the receiver for enhanced serviceability. One exemplification of such design approach may be found set forth in U.S. Pat. No. 3,708,618, issued to Richard J. Hofmeister, et al., on Jan. 2, 1973 and assigned to the assignee of the present invention. As therein shown, the slidable drawer assembly includes a suitable interlock to remove operating power to the component parts upon pulling out of the drawer assembly. However, it is only the low voltage that is interrupted since the flyback transformer and high voltage rectifier supplying the high voltage to the ultor or second anode of the cathode ray tube is not located in the slide-out drawer itself, but elsewhere within the interior of the receiver cabinet. To service the high voltage components, the back cover must be removed the same as for conventional television sets.

A suggestion has been made to include the flyback transformer and/or other high voltage components within the pull-out slideable drawer assembly along with the other operating components so that removal of the drawer assembly for in-shop testing or servicing will also cover the operability of the flyback transformer and associated high voltage components. However, to include the flyback transformer in the service drawer necessitates a relatively inexpensive but nevertheless an effective and reliable disconnect arrangement for the high voltage supplied to the picture tube upon pull-out of the service drawer. Until now, no such arrangement has proven entirely satisfactory for the purpose intended.

Accordingly, it is an object of the present invention to provide an improved high voltage connect-disconnect arrangement especially suited to television receiver application.

A more particular object is to provide an improved high voltage connector arrangement for a television receiver wherein the high voltage applied to the picture tube is automatically disconnected upon pull-out of an associated drawer assembly containing at least a majority of the receiver's operating components.

Another object of the present invention is to provide an improved high voltage connector arrangement of the foregoing type wherein the high voltage is automatically reestablished to the picture tube upon the service drawer being pushed back into the receiver's cabinet.

Yet another object of the present invention is to provide an improved high voltage connector arrangement of the foregoing type wherein the high voltage rectifier, customarily included as part of the television receiver, further forms part of the connector arrangement.

A further object of the present invention is to provide an improved high voltage connector arrangement of the foregoing type wherein the high voltage rectifier is self-aligning upon insertion into the associated connector body.

Still another object of the present invention is to provide a high voltage connector arrangement of the foregoing type wherein light force is required for inserting the high voltage rectifier into the associated connector body but less than zero force is required for extraction of the same, and wherein suitable anti-corona protection is effected within the connector body during disconnect operations.

SUMMARY OF THE INVENTION

In practicing the invention, a connector assembly is provided for attachment on the interior of the back cover of a television receiver and wherein the associated high voltage rectifier inserts therein to complete the high voltage connection to the ultor or second anode of the picture tube as supplied from the usual flyback transformer within the receiver. The connector body is suitably funnel-shaped to provide a self-alignment feature for the rectifier when inserting in the connector body. Further, the tip of the rectifier positions within an anti-corona ring in the base of the connector body. A resilient spring is also included at the same location and works against the tip of the inserted rectifier. Accordingly, while some positive force must be exerted to overcome the influence of the spring in inserting the rectifier to make connection less than zero extraction force will be exhibited by virtue of the positive bias exerted by such spring. Further by using the high voltage rectifier or diode itself as part of the connector assembly, the number of component parts is thereby effectively minimized.

BRIEF DESCRIPTION OF THE DRAWING

The feature of the present invention which are believed to be novel are set forth with particularity in the appended claims. The invention itself, however, together with further objects and advantages thereof, may best be understood by reference to the following description when taken in conjunction with the accompanying drawings, in which:

BRIEF DESCRIPTION OF THE PREFERRED EMBODIMENT

Figure 1:
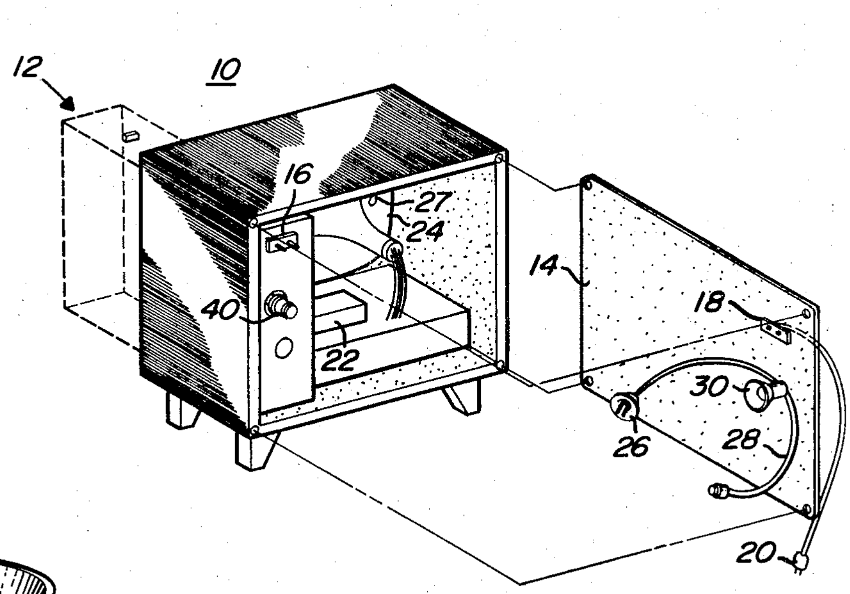
FIG. 1 is a graphic representation of a television receiver of the type having a pull-out drawer assembly into which the present invention may be applied.
Figure 2:
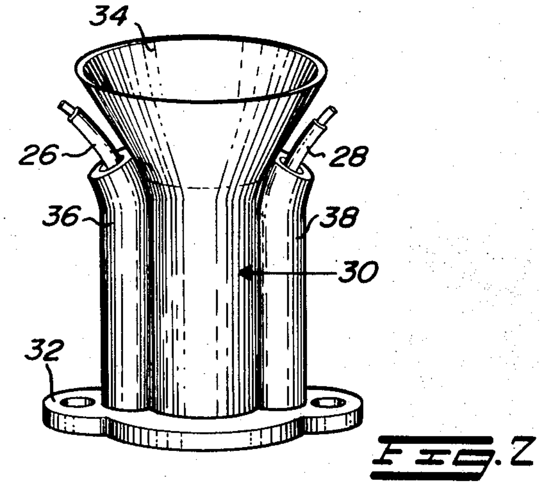
FIG. 2 is a view in perspective of a connector or body construction in accordance with the present invention.

Referring now to the drawings, a television receiver is shown in FIG. 1 of the type having a pull-out drawer assembly 12 for convenient servicing and the like. The receiver is shown with the associated back cover 14 removed from the rear of the cabinet. As will be appreciated, an interlock with respect to operating power is provided which, inter alia, includes a male connector 16 on the rear of the drawer assembly 12 which mates with a female connector 18 to which operating power is supplied by a conventional line-plug arrangement 20, as shown. For a more detailed operational description of such receiver 10 with the pull-out drawer assembly 12, reference may be made to the aforementioned Hofmeister, et al. patent.

Unlike the receiver apparatus as shown and described in the Hofmeister patent, however, the flyback transformer assembly (not specifically shown herein) is included in the drawer assembly 12 itself, rather than elsewhere in the receiver's interior cabinet space. However, the conventional focus block 22 is included in the interior of the cabinet separate from the drawer assembly 12, as seen in FIG. 1. With the flyback transformer in the drawer assembly 12, it may be likewise checked and otherwise tested out operationally upon removal of the drawer assembly 12 for in-shop testing and servicing operations. This of course necessitates a reliable connect/disconnect arrangement for application of the required high voltage of the ultor or second anode 77 of the receiver's picture or cathode ray tube 24.

Figure 3:
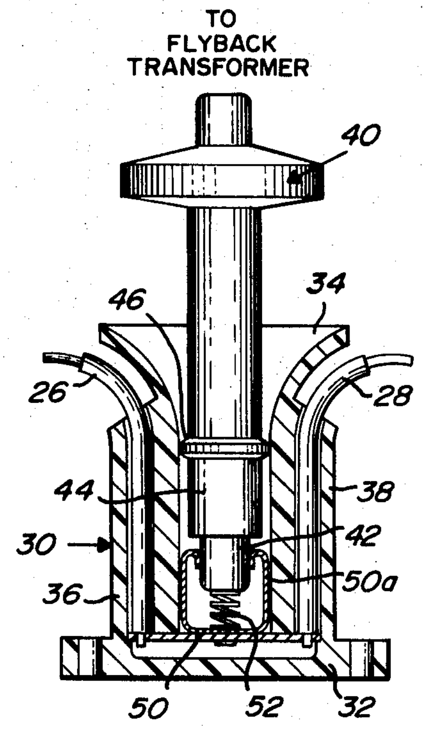
FIG. 3 is a cross section of the connector body as shown in FIG. 2 together with a high voltage rectifier inserted therein for establishing high voltage connection.

The necessary high voltage connector arrangement is provided by a connector assembly or body 30 in conjunction with the high voltage rectifier or diode 40, conventionally included as part of the television receiver (best seen in FIG. 3). A lead 26 extends from the connector assembly 30 for releasable attachment to high voltage anode terminal 27 of the picture tube 24, and another lead 28 extends therefrom for releasable connection to the focus block 22. Accordingly, when the drawer assembly 2 is pulled out from the front of the receiver, as depicted in dotted-line in FIG. 1, not only is the drawer assembly interlock connector 16 disengaged from the operating power interlock connector 18, but the high voltage rectifier 40 is likewise disengaged from its associated connector body 30 so as to effectively interrupt the application of high voltage to the receiver's picture tube 24. The respective electrical connections are shown schematically in the simplified schematic of FIG. 4.

Figure 4:
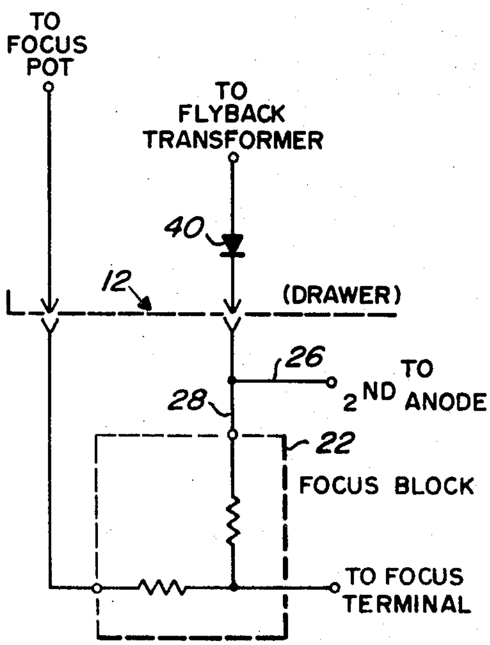
FIG. 4 is a partial schematic representation of a conventional high voltage arrangement for a television receiver including the high voltage rectifier and focus block.

The connector assembly or body 30 is shown more clearly in FIGS. 3 and 4. Connector 30 includes a base 32 of suitable insulating material on which a tubular housing 34 of the same material extends laterally upwardly or normal thereto. Housing 34 is funnel-shaped, flaring out wider at its open top portion then at its closed bottom portion. A pair of channels or passage ways 36 and 38 extend parallel to housing 34 on respective sides thereof and forms the respective entryways for connector leads 26 and 28 to the interior of the connector body 30.

As will best be seen in FIG. 3, and anti-corona device or ring 50 is included in the bottom of the interior of housing 34. The anti-corona device is of a generally cylindrical shape, open at the top, with an in-turned lip 50*a* having an inside diameter which loosely fits the outside diameter of the forward tip 42 of the high voltage rectifier 40, substantially as shown in FIG. 3. Further, a resilient spring 52 is positioned in the interior of the anti-corona ring device 50 as as to coact with the tip 42 of rectifier 40.

The rectifier 40 itself includes a long cylindrical body 44 somewhat smaller in diameter than the inside diameter of the narrowed down interior of housing 34. However, an enlarged guide ring 46 is formed about a forward portion of the rectifier body 44, which ring makes a sliding fit within the interior of housing 34. As will be appreciated, guide ring 46 thus coacts with the funnel-shaped interior of housing 34 to provide a self-aligning feature for the rectifier 40 when inserted into connector body 30.

As will be further appreciated, the presence of spring 50 means that some positive force must be exerted to fully insert rectifier 40 into the connector body 30 whereby tip 42 is fully within the anti-corona ring 50, compressing spring 50 to some extent or another. However, this also means that there is less than zero extraction force required, since spring 50 provides a set bias working against tip 42 of rectifier 40.

It is to be understood that while the high voltage connector arrangement of the present invention is shown and described in relation to television receiver application, it is in no way limited thereto. The invention can and will find attractive use in any application where high voltage connection is to be made and broken and where self-alignment and an insertable component and/or low extraction force proves to be an advantageous operational characteristic.

It is to be further understood that while only a specific emnodiment of the present invention is shown and described herein, other variations and alternative constructions may be effected without materially departing from the true spirit and scope of the present invention. The appended claims are intended to cover all such modifications and alternative constructions that fall within such true scope and spirit.

What is claimed is:

1. Electrical connector apparatus for making and breaking high voltage connection between elected circuit components, comprising in combination:

a funnel-shaped connector of insulating material having anti-corona means and resilient spring means mounted within the base thereof and forming a high voltage terminal point;

lead means attached to said high voltage terminal point; and an elongated circuit element for supplying high voltage to said terminal point, said element having a forward portion for engagement with said anti-corona means and compressing said spring means, said circuit element further including a guide ring thereabout for making a sliding fit within said funnel-shaped connector body to effect self-alignment for said circuit element, said compressed spring means providing less than zero extraction force for said elongated circuit element breaking high voltage connection.

2. Electrical connector apparatus in accordance with claim 1 wherein said anti-corona means is cylindrically shaped having an opening at the top thereof formed by an in-turned lip for making contact with said forward portion of said circuit element.

3. Electrical connector apparatus in accordance with claim 2 wherein said resilient spring means is mounted at the interior base of said anti-corona means.

4. Electrical connector apparatus for making and breaking high voltage connection between a flyback transformer positioned in a slide-out drawer assembly and a high voltage anode of a picture tube in a television receiver, comprising in combination:

a funnel-shaped connector of insulating material having anti-corona means and resilient spring means within a base portion thereof and forming a high voltage terminal point;

lead means for interconnecting at least said high voltage terminal point to the high voltage anode of the receiver picture tube; and an elongated high voltage rectifier having connecting terminals at respective ends, one of which is adapted to connect with the flyback transformer, and the other of which extends outwardly from the drawer assembly;

said rectifier further having a guide ring thereabout for making a sliding fit within said funnel-shaped connector and thereby effect self-alignment for said rectifier, said other rectifier connection terminal being adapted for insertion in said anti-corona means and compressing said spring means within said connector body when the drawer assembly is fully closed, said compressed spring means providing less than zero extraction force for said rectifier upon pull-out of the drawer assembly.

5. Electrical connector apparatus in accordance with claim 4 wherein said anti-corona means is cylindrically shaped havng an opening at the top formed by an inturned lip for making contact with said other connection terminal of said high voltage rectifier.

6. Electrical connector apparatus in accordance with claim 5 wherein said resilient spring means is mounted at the interior base of said anti-corona means.

7. Electrical connector apparatus in accordance with claim 4 wherein said funnel-shaped connector is mounted within the interior of said receiver.

8. Electrical connector apparatus in accordance with claim 4 wherein a focus block is included in the interior of said television receiver and said lead means further interconnects said high voltage terminal in said connector and said focus block.

* * * * *